(12) United States Patent
Dygert et al.

(10) Patent No.: US 10,737,822 B2
(45) Date of Patent: Aug. 11, 2020

(54) CONTAINER AND METHOD OF MANUFACTURE

(71) Applicant: RING Container Technologies, Oakland, TN (US)

(72) Inventors: Douglas Miles Dygert, Olive Branch, MS (US); Dennis W. Koerner, Memphis, TN (US)

(73) Assignee: RING CONTAINER TECHNOLOGIES, LLC, Oakland, TN (US)

( * ) Notice: Subject to any disclaimer, the term of this patent is extended or adjusted under 35 U.S.C. 154(b) by 697 days.

(21) Appl. No.: 14/673,120

(22) Filed: Mar. 30, 2015

(65) Prior Publication Data

US 2016/0288942 A1 Oct. 6, 2016

(51) Int. Cl.
*B65D 1/02* (2006.01)
*B29C 49/48* (2006.01)
(Continued)

(52) U.S. Cl.
CPC ........ *B65D 1/0207* (2013.01); *B29C 49/0073* (2013.01); *B29C 49/12* (2013.01); *B29C 49/4273* (2013.01); *B65D 1/023* (2013.01); *B65D 1/16* (2013.01); *B29B 2911/14693* (2013.01); *B29B 2911/14713* (2013.01); *B29B 2911/14906* (2013.01); *B29C 49/06* (2013.01); *B29C 2049/4869* (2013.01); *B29C 2793/009* (2013.01); *B29C 2793/0027* (2013.01); *B29K 2023/065* (2013.01); *B29K 2067/003* (2013.01); *B29K 2105/258* (2013.01); *B29K 2995/004* (2013.01); *B29K 2995/0063* (2013.01);
(Continued)

(58) Field of Classification Search
CPC ........ B65D 1/0207; B65D 1/023; B29C 49/12
USPC ............................................ 215/40; 428/35.7
See application file for complete search history.

(56) References Cited

U.S. PATENT DOCUMENTS

2006/0255049 A1 11/2006 McCarthy et al.
2011/0070388 A1* 3/2011 Schneider ........... B29C 49/0005
428/36.92
(Continued)

FOREIGN PATENT DOCUMENTS

| EP | 197780 A2 | 10/1986 |
|---|---|---|
| EP | 625172 A1 | 11/1994 |
| EP | 1140637 A1 | 10/2001 |

OTHER PUBLICATIONS

Written Opinion of the International Searching Authority—Form PCT/ISA/237—International Application No. PCT/US2016/023590, Applicant—Ring Container Technologies, International Search Report—Form PCT/ISA/210 dated Jun. 6, 2016 by International Searching Authority—European Patent Office.

*Primary Examiner* — Anthony D Stashick
*Assistant Examiner* — Raven Collins
(74) *Attorney, Agent, or Firm* — Sorell, Lenna & Schmidt, LLP (57) ABSTRACT

A food and/or beverage packaging container comprises a blow-molded body having a length, a diameter and side walls having a wall thickness. A wide mouth neck extends from the body and is trimmed to a finished configuration. The neck has a diameter and a wall thickness. The length, the diameters and the wall thickness' are pre-selected such that the container comprises one or more selected physical performance features. Systems and methods of use are disclosed.

20 Claims, 9 Drawing Sheets

(51) Int. Cl.
*B29C 49/12* (2006.01)
*B65D 1/16* (2006.01)
*B29C 49/00* (2006.01)
*B29C 49/42* (2006.01)
B29K 23/00 (2006.01)
B29C 49/06 (2006.01)
B29K 67/00 (2006.01)
B29K 105/00 (2006.01)
B29L 31/00 (2006.01)

(52) U.S. Cl.
CPC ............. *B29K 2995/0067* (2013.01); *B29K 2995/0078* (2013.01); *B29K 2995/0082* (2013.01); *B29L 2031/716* (2013.01)

(56) References Cited

U.S. PATENT DOCUMENTS

| | | | |
|---|---|---|---|
| 2011/0089195 A1* | 4/2011 | Penny | B29B 11/14 222/109 |
| 2012/0076965 A1* | 3/2012 | Silvers | B29C 49/0005 428/36.92 |
| 2012/0187068 A1* | 7/2012 | Fuse | B29C 49/00 215/40 |
| 2014/0120606 A1* | 5/2014 | Wolters | B29C 49/46 435/289.1 |
| 2017/0100872 A1* | 4/2017 | Clarke | B29C 49/06 |

* cited by examiner

STAGE 1

STAGE 2

CONTAINER AND METHOD OF MANUFACTURE

TECHNICAL FIELD

The present disclosure generally relates to blow-molded containers and more particularly to wide mouth plastic containers and methods for making the same for food packaging.

BACKGROUND

Plastic blow-molded containers are commonly used for food packaging products. Many food and beverage products are sold to the consuming public in wide mouth jar-like blow-molded containers. These containers can be made from polyethylene terephythalate or other suitable plastic resins in a range of sizes. The empty blow-molded containers can be filled with food and/or beverage products at a fill site utilizing automated fill equipment.

For example, manufacture of such plastic blow-molded containers can include initially forming plastic resin into a preform, which may be provided by injection molding. Typically, the preform includes a mouth and a generally tubular body that terminates in a closed end. Prior to being formed into containers, preforms are softened and transferred into a mold cavity configured in the shape of a selected container. In the mold cavity, the preforms are blow-molded or stretch blow-molded and expanded into the selected container.

Such plastic blow-molded containers may be produced on single stage injection mold equipment. The single stage blow molding process combines the injection molding of the preform and blowing of the container into one machine. This machine has an extruder that melts resin pellets and injects the molten resin into a mold to create the preform. The preform is transferred to a blow station to form the container and removed from the machine. In some cases, the plastic blow-molded containers are produced with two-stage equipment. The two-stage equipment makes preforms in an injection molding machine and then reheats and blows the preforms into selected containers in a separate blowing machine. This disclosure describes an improvement over these prior art technologies.

SUMMARY

In one embodiment, a food and/or beverage packaging container is provided. The food and/or beverage packaging container comprises a blow-molded body having a length, a diameter and side walls having a wall thickness. A wide mouth neck extends from the body and is trimmed to a finished configuration. The neck has a diameter and a wall thickness. The length, the diameters and the wall thickness' are selected such that the container comprises one or more selected physical performance features. Systems and methods of use are disclosed.

BRIEF DESCRIPTION OF THE DRAWINGS

The present disclosure will become more readily apparent from the specific description accompanied by the following drawings, in which.

DETAILED DESCRIPTION

The exemplary embodiments of blow-molded containers and more particularly, wide mouth polyethylene terephythalate (PET) containers and methods for making the same are discussed in terms of food packaging products. In some embodiments, the present container is manufactured via an injection molded preform, which is subjected to a blow mold and trim process. In some embodiments, the present container can be filled with food, food preparation oils, viscous and/or beverage products. In some embodiments, the present container can be employed as a cold fill container. In some embodiments, the present container can be employed as a hot fill container. In some embodiments, the present container is manufactured as a 22 ounce container filled with a non-dairy creamer. In some embodiments, the present container is manufactured as a one kilogram container filled with a non-dairy creamer. In some embodiments, the present container is manufactured as a 60 ounce container filled with peanut butter. In some embodiments, the present container is employed as a light weight, high strength and barrier food packaging product.

In some embodiments, the present disclosure includes a container system that is employed with a method for manufacturing food packaging having the ability to produce food packages made from PET with minimal weight and selectively desirable physical performance features, as described herein.

In some embodiments, the present container is manufactured with selective physical performance features, such as, for example, a reduction in plastic weight, a selected preform design, selected bottle processing and/or bottle crystallinity of side walls of a blown container. In some embodiments, the selected physical performance features can include a higher injection molding efficiency and/or cavitation and an increased bi-axial orientation of PET container material. In some embodiments, the present container is manufactured with a smaller diameter preform, which forms a final bottle neck finish through the blowing process that allows for higher injection mold efficiency as well as improved material orientation throughout the container. In some embodiments, the container includes an improved material distribution and crystalline orientation. In some embodiments, this manufacturing method provides a container having improved top load, vacuum resistance and/or permeability. In some embodiments, this manufacturing method provides stretching PET to optimum crystalline orientation levels to improve physical performance in top load, vacuum, gas and vapor permeation through the container side walls.

In some embodiments, the present container is manufactured with selected physical performance features, such as, for example, a 60 ounce PET container having a body width of approximately 4.834 inches (in), a body depth of approximately 4.620 in, a neck diameter of 110 millimeters (mm), a weight of 96 grams (g), a T/L weight of 90 g, a vacuum average actual of 2.107 in of mercury (inHg) and a vacuum minimum actual of 1.100 inHg.

In some embodiments, the present container is manufactured with selected physical performance features, such as, for example, a 60 ounce PET container having a body width of approximately 4.834 in, a body depth of approximately 4.620 in, a neck diameter of 110 mm, a weight of 96 g, a T/L weight of 68 g, a vacuum average actual of 1.562 inHg and a vacuum minimum actual of 1.210 inHg.

In some embodiments, the present container is manufactured with selected physical performance features, such as, for example, a 22 ounce high-density polyethylene (HDPE) container having a body width of approximately 3.800 in, a body depth of approximately 3.800 in, a neck diameter of 63 mm, a weight of 47 g, a T/L weight of 40 g, a top load minimum of 40 pound-force (Lbf) and a top load target of 95 Lbf.

In some embodiments, the present container is manufactured with selected physical performance features, such as, for example, a 1 kg HDPE container having a body width of approximately 4.760 in, a body depth of approximately 4.760 in, a neck diameter of 63 mm, a weight of 77 g, a T/L weight of 60 g, a top load minimum of 90 Lbf and a top load target of 115 Lbf.

In some embodiments, the present manufacturing method provides PET enhancements via improved material orientation with selective physical performance features, such as, for example, improved top load performance, improved vacuum resistance performance and/or hoop strength, improved oxygen ($O_2$) performance, and improved moisture vapor transmission rate (MVTR) performance.

In some embodiments, the present manufacturing method includes the steps of employing a single stage blow molding process and providing a preform that produces containers having a dome. In some embodiments, the method includes the step of testing the one or more preforms to ensure the one or more preforms include a selected weight and selected neck finish dimension. In some embodiments, the method includes the step of employing the one or more preforms with a four cavity production mold. In some embodiments, the method includes the step of blow molding the one or more preforms, which may comprise a container. In some embodiments, the method includes the step of trimming the one or more blow-molded preforms. In some embodiments, the step of trimming includes a spin trim operation to remove a dome from the one or more blow-molded preforms. In some embodiments, the method includes a two-stage blow molding process such that the one or more preforms are injection molded and stored before blowing the one or more preforms to produce a container.

The present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. Also, in some embodiments, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of a container system for producing food packaging products, a container, related components and methods of manufacturing a container with an injection molded preform. Alternate embodiments are also disclosed. Reference is made in detail to the exemplary embodiments of the present disclosure, which are illustrated in the accompanying figures. Turning to FIGS. 1-14, there are illustrated components of a container system and methods of manufacturing a container.

Figure 6:
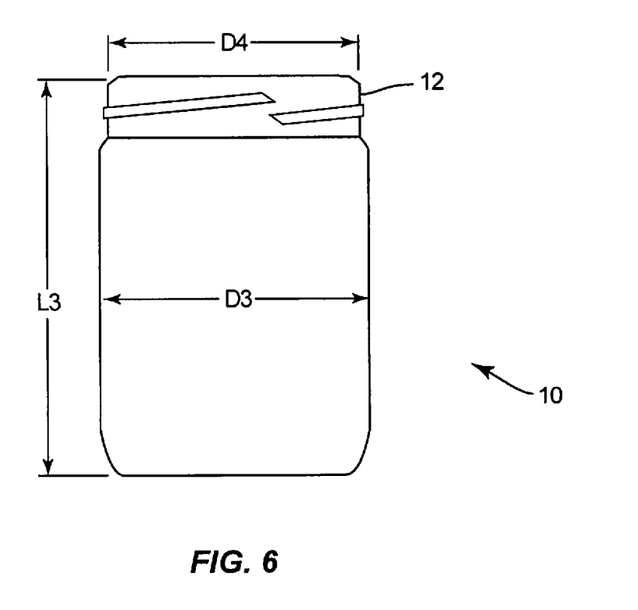
FIG. 6 is a side view of a component of one embodiment of a container system in accordance with the principles of the present disclosure.

A finished PET blow-molded, wide mouth container 10, as shown in FIG. 6, is constructed for use with a selected application, as described herein. In some embodiments, the selected application includes food, food preparation oils, viscous and/or beverage products. In some embodiments, the selected application includes a 22 ounce container filled with a non-dairy creamer. In some embodiments, the selected application includes a one kilogram container filled with a non-dairy creamer. In some embodiments, the selected application includes a 60 ounce container filled with peanut butter.

Figure 1:
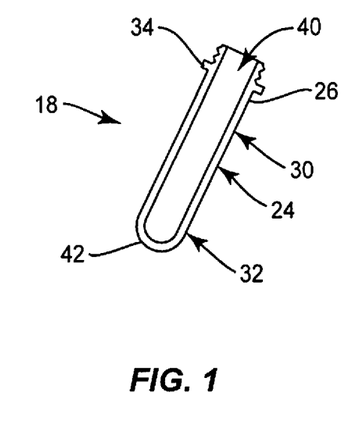
FIG. 1 is a side cross section view of a component of one embodiment of a container system in accordance with the principles of the present disclosure.
Figure 2:
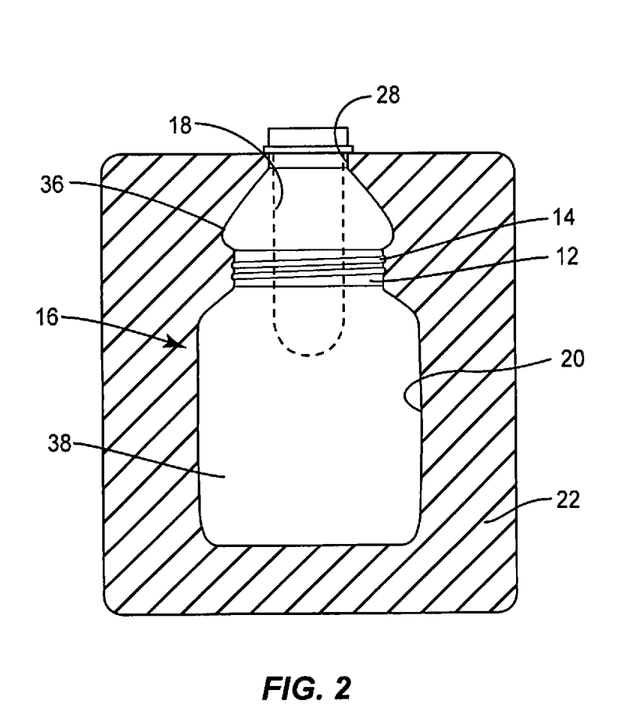
FIG. 2 is a side cross section view of components of one embodiment of a container system in accordance with the principles of the present disclosure.

In some embodiments, finished container 10 comprises a bottle for food and/or beverage product packaging having a cylindrical threaded neck 12 wherein an outer diameter of a continuous thread 14 is in a range of about 53 mm to about 162 mm. In some embodiments, finished container 10 is manufactured via a two-stage method, as described herein, having an outer finish diameter in a range of about 53 mm to about 120 mm. In some embodiments, finished container 10 is manufactured via a single stage method, as described herein, having an outer finish diameter of about 162 mm. Container 10 is produced as a lower part of an intermediate article 16, as shown in FIG. 2. In some embodiments, container 10 is formed by injection molding a preform 18 and then placing preform 18 into a cavity 20 of a mold assembly 22, to be blown, as shown in FIGS. 1 and 2.

Figure 3:
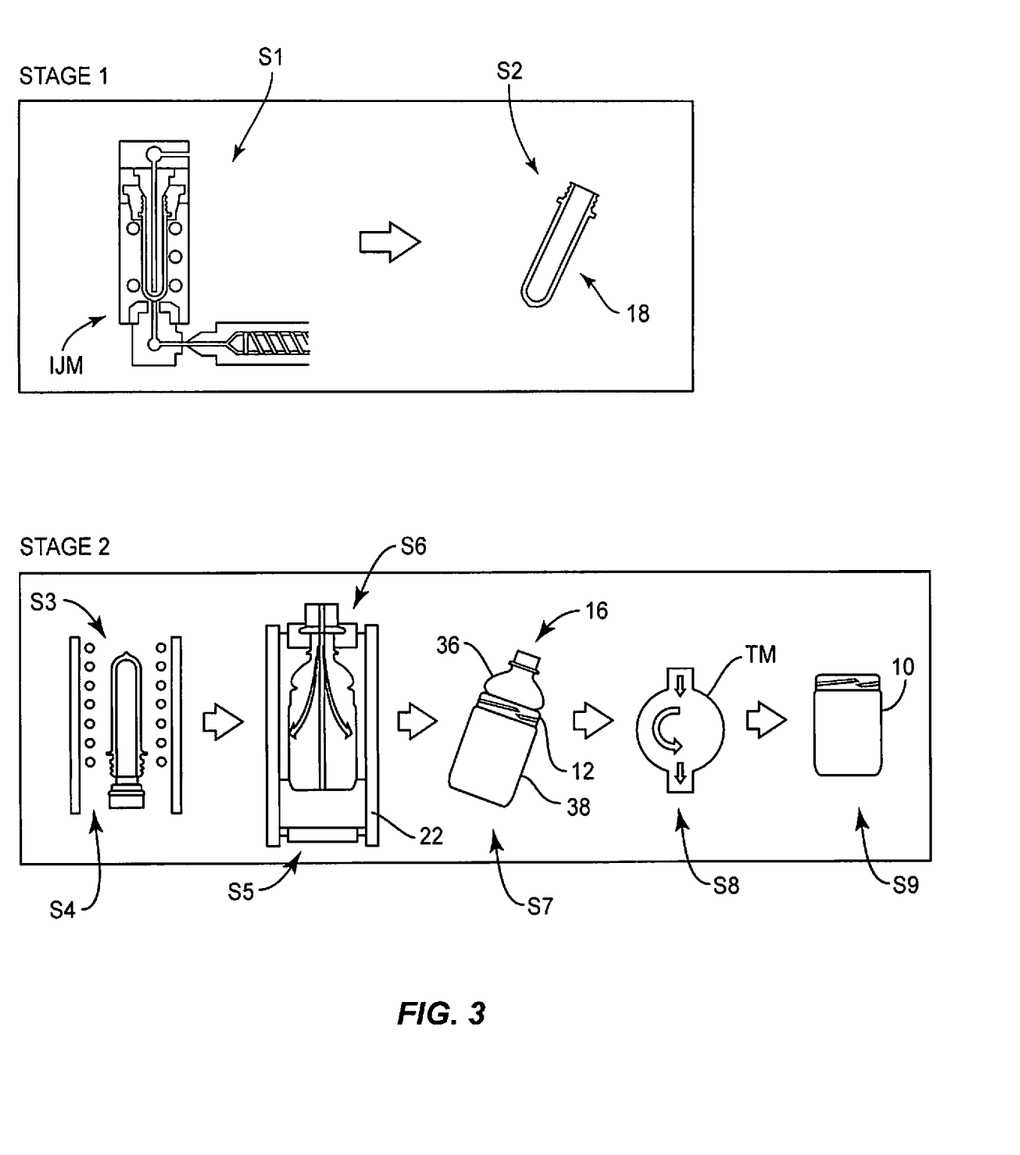
FIG. 3 is a schematic view of a method of manufacturing a container in accordance with the principles of the present disclosure.

In some embodiments, container 10 is manufactured via a two-stage method, as shown in FIG. 3. In some embodiments, an initial step S1 includes injection molding a preform 18 in an injection molding machine IJM during a first stage of the manufacturing operation. Preform 18 has a thread forming surface 24 below a preform neck 26. In some embodiments, preform 18 has thread forming surface 24, which includes a portion of preform 18 below neck 26 that will press against mold assembly 22 to form neck 12 and thread 14. In some embodiments, container 10 may be manufactured with a snap fit portion, spiral threads and/or a beaded rim. In some embodiments, preform 18 can be injection molded with a neck diameter smaller than the neck diameter of finished container 10, such that a diameter of an opening 28 at a top of mold assembly 22 is substantially reduced. As such, a plurality of mold cavities may be placed in mold assembly 22 of a blow machine of the two-stage equipment to provide improved production capacity. In some embodiments, container 10 may be manufactured with a hoop stretch ratio in a range of about 1.6 to 1 to about 2.0 to 1. In some embodiments, a step S2 includes removing preform 18 from machine IJM.

In some embodiments, the two-stage method includes one or more steps in a second stage of the manufacturing operation. For example, in a step S3 of the second stage, preform 18 is provided having a dome forming surface 30, thread forming surface 24 and a body forming surface 32. In some embodiments, the second stage includes a step S4, which comprises pre-heating preform 18 to a temperature in a range of about 95 degrees Celsius (C) to about 110 degrees C.

In some embodiments, the second stage includes a step S5, which comprises mounting pre-heated preform 18 in place within cavity 20 of mold assembly 22. Mold assembly 22 has an interior mold surface shaped to correspond to the selected configuration of container 10. In some embodiments, the temperature of mold assembly 22 is in a range of about 40 degrees Fahrenheit (F) to about 110 degrees F. Preform 18 has a flange 34, which mounts on mold assembly 22 adjacent opening 28. Preform 18 has surface 30 that forms dome 36 of intermediate article 16, surface 24 that forms neck 12 of intermediate article 16 and surface 32, which forms body 38 of intermediate article 16. In some embodiments, surface 30 has a wall thickness in a range of about 0.100 inches (in) to about 0.200 in. In some embodiments, surface 24 has a wall thickness in a range of about 0.100 in to about 0.200 in. In some embodiments, surface 32 has a wall thickness in a range of about 0.100 in to about 0.200 in.

Figure 4:
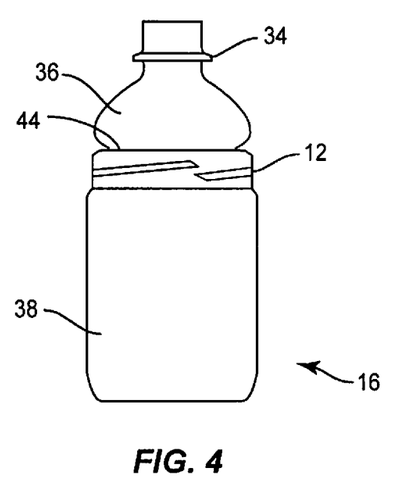
FIG. 4 is a side view of a component of one embodiment of a container system in accordance with the principles of the present disclosure.

A step S6 includes blowing air into preform 18 to mold intermediate article 16, as shown in FIG. 4. In some embodiments, air is blown from a dryer and at a pressure in a range of about 35 to about 40 bar blown into an open end 40 of preform 18 to stretch or extend surfaces 30, 24, 32 and a bottom surface 42 of preform 18 radially outwardly and axially downwardly against the interior molding surface of mold assembly 22, as shown in FIG. 3. A step S7 includes removing intermediate article 16 from mold assembly 22.

Figure 5:
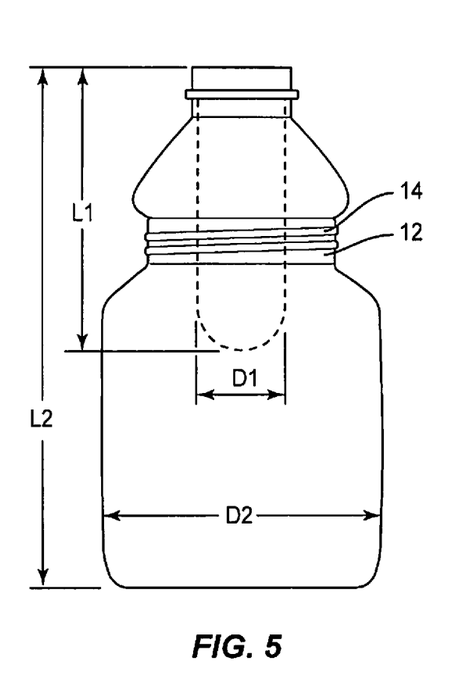
FIG. 5 is a side cross section view of a component of one embodiment of a container system in accordance with the principles of the present disclosure.

In some embodiments, as shown in FIG. 5, preform 18 has a diameter D1 adjacent surface 24 and a length L1; and intermediate article 16 has a diameter D2 and a length L2. In some embodiments, diameter D2 is about 6 inches and length L2 is about 10.3 inches, and finished container 10, after trimming of intermediate article 16 as described herein, has a diameter D3, as shown in FIG. 6, of about 7.25 inches. In some embodiments, diameter D1 is about 3.3 inches and length L1 is about 6.2 inches.

In some embodiments, dome 36 is attached to an upper edge of neck 12 along an annular recess 44. In some embodiments, the second stage includes a step S8, which comprises removing and/or trimming off dome 36 from intermediate article 16 adjacent neck 12 with a trimming machine TM. Dome 36 is severed from intermediate article 16 to produce finished container 10, as shown in FIG. 6. As such, the second stage includes a step S9 of providing finished container 10.

Figure 7:
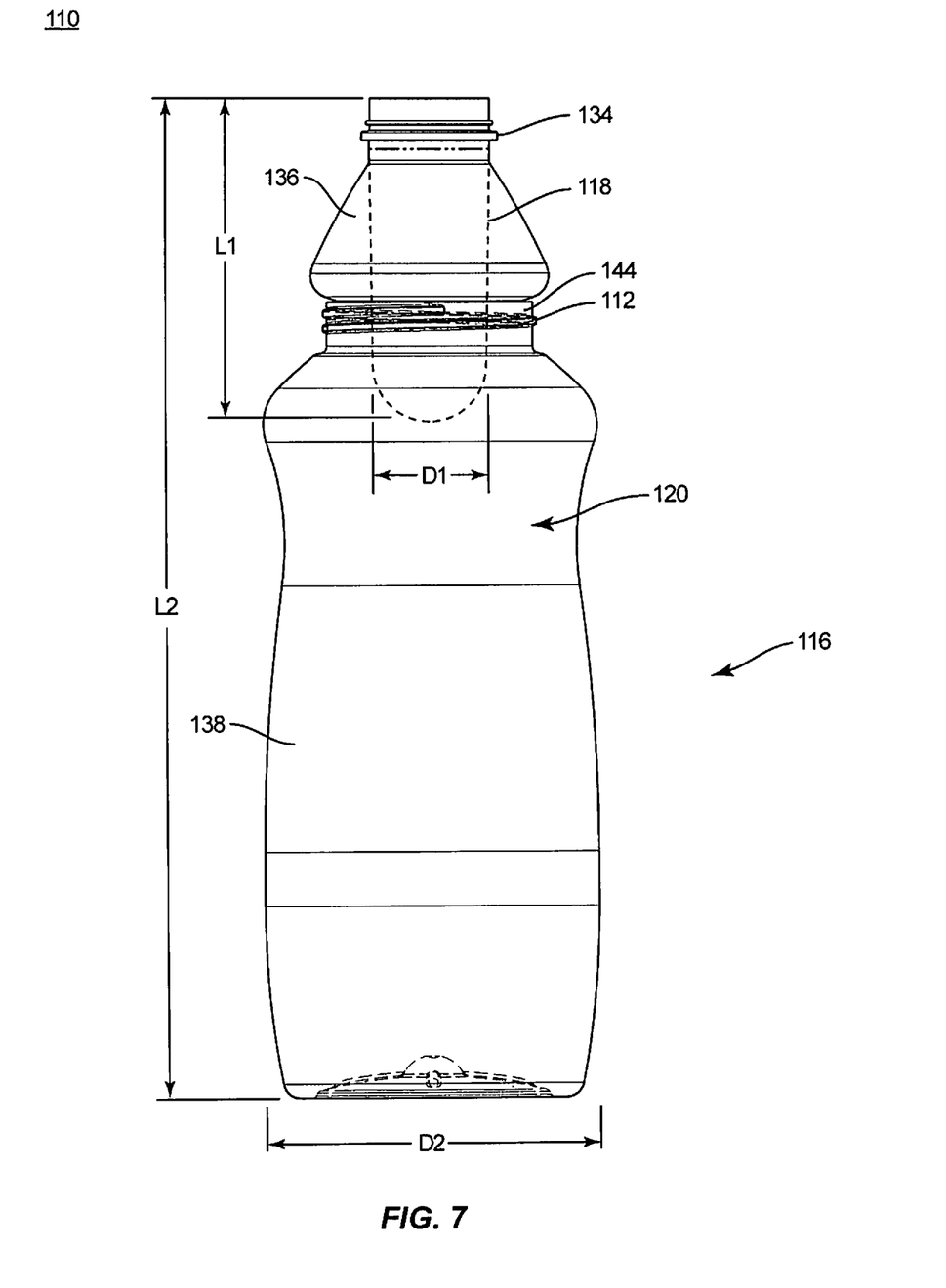
FIG. 7 is a side cross section view of components of one embodiment of a container system in accordance with the principles of the present disclosure.
Figure 8:
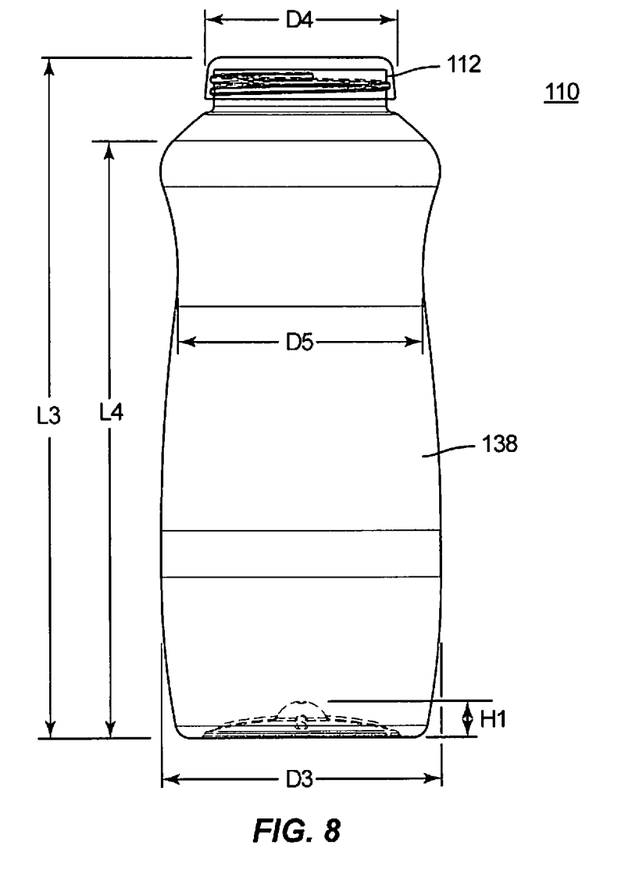
FIG. 8 is a side cross section view of components of one embodiment of a container system in accordance with the principles of the present disclosure.
Figure 9:
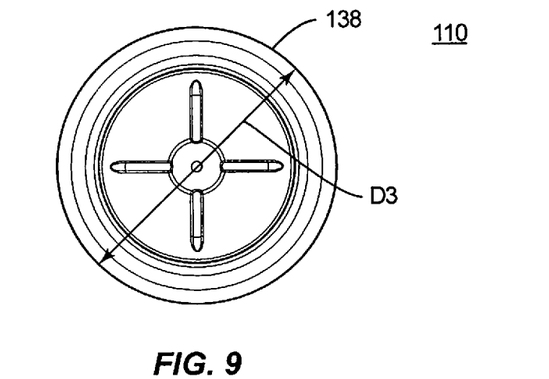
FIG. 9 is a bottom view of components of one embodiment of a container system in accordance with the principles of the present disclosure.

In one embodiment, as shown in FIGS. 7-9, a container 110, similar to container 10 and methods described herein, is manufactured as a 22 ounce PET container. Container 110 includes an intermediate article 116. In some embodiments, a preform 118 is placed within cavity 120. Preform 118 has a flange 134. Preform 118 forms dome 136 of intermediate article 116 and forms body 138 of intermediate article 116.

In some embodiments, as shown in FIG. 7, preform 118 has a diameter D1 and a length L1; and intermediate article 116 has a diameter D2 and a length L2. In some embodiments, diameter D2 is about 3.8 in and length L2 is about 11.446 in. In some embodiments, dome 136 is attached to an upper edge of neck 112 along an annular recess 144. In some embodiments, finished container 110, after trimming of intermediate article 116 as described herein, has a diameter D3 of about 3.8 in, a body length L3 of approximately 9.110 in, a neck diameter D4 of 63 mm, a weight of 47 g, a T/L weight of 40 g, a top load minimum of 40 Lbf and a top load target of 95 Lbf. In some embodiments, finished container 110, as described herein, is manufactured to include a base having raised rings.

In some embodiments, finished container 110, as described herein, is manufactured to include a shoulder length L4, as shown in FIG. 8, of about 7.76 in, a density average of 1.365, a density standard deviation of 0.001, an average crystallinity in a range of about 25.8% and a crystallinity standard deviation of 0.9%.

In some embodiments, finished container 110, as described herein, is manufactured to include a panel diameter D5, as shown in FIG. 8, of about 4.11 in, a density average of 1.364, a density standard deviation of 0.002, an average crystallinity in a range of about 25.3% and a crystallinity standard deviation of 1.4%.

In some embodiments, finished container 110, as described herein, is manufactured to include a base height H1, as shown in FIG. 8, of about 0.64 in, a density average of 1.358, a density standard deviation of 0.001, an average crystallinity in a range of about 20.5% and a crystallinity standard deviation of 0.7%.

Figure 10:
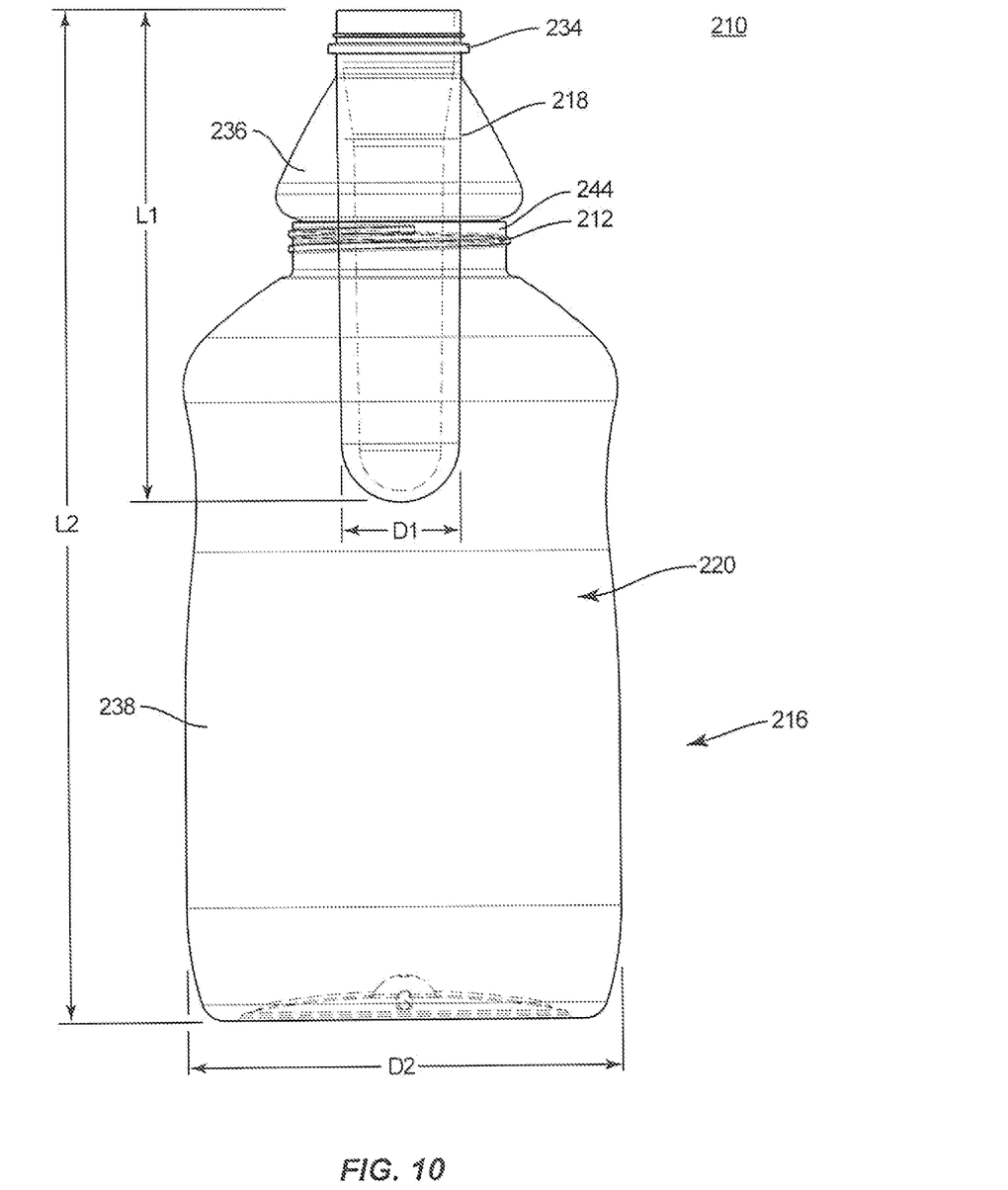
FIG. 10 is a side cross section view of components of one embodiment of a container system in accordance with the principles of the present disclosure.
Figure 11:
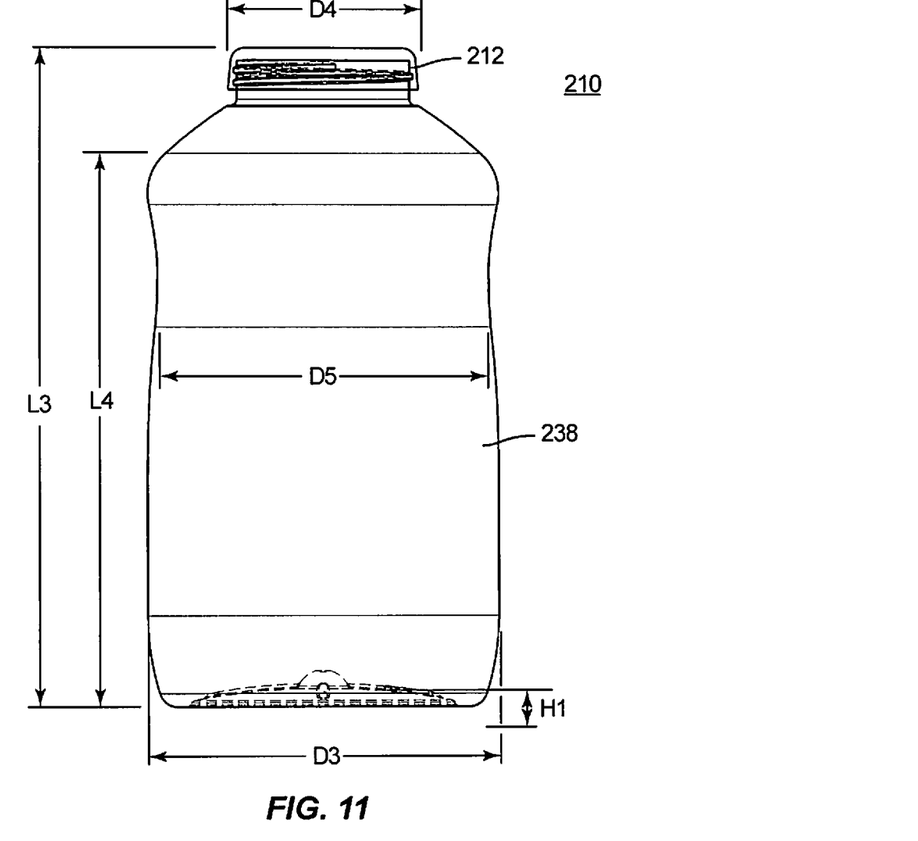
FIG. 11 is a side cross section view of components of one embodiment of a container system in accordance with the principles of the present disclosure.
Figure 12:
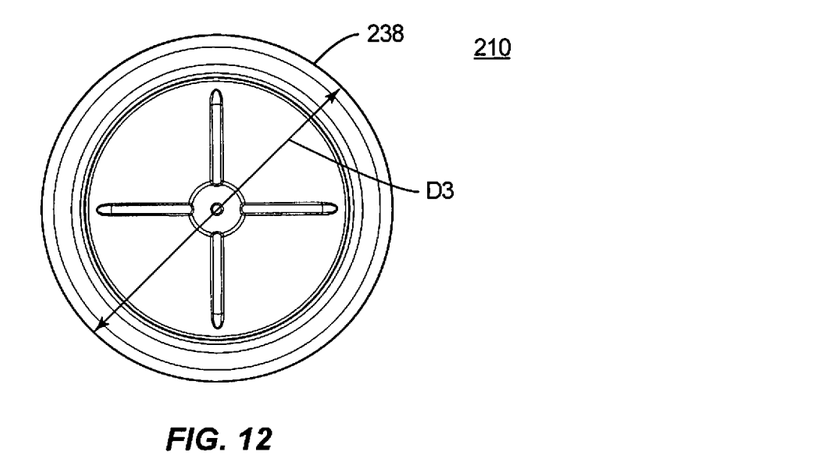
FIG. 12 is a bottom view of components of one embodiment of a container system in accordance with the principles of the present disclosure.

In one embodiment, as shown in FIGS. 10-12, a container 210, similar to the containers and methods described herein, is manufactured as one kg HDPE container. Container 210 includes an intermediate article 216. In some embodiments, a preform 218 is placed within cavity 220. Preform 218 has a flange 234. Preform 218 forms dome 236 of intermediate article 216 and forms body 238 of intermediate article 216.

In some embodiments, as shown in FIG. 10, preform 218 has a diameter D1 and a length L1; and intermediate article 216 has a diameter D2 and a length L2. In some embodiments, diameter D2 is about 4.76 in and length L2 is about 11.151 in. In some embodiments, dome 236 is attached to an upper edge of neck 212 along an annular recess 244. In some embodiments, as shown in FIG. 11, finished container 210, after trimming of intermediate article 216 as described herein, has a diameter D3 of about 4.760 in, a body length L3 of approximately 8.815 in, a neck diameter D4 of 63 mm, a weight of 77 g, a T/L weight of 60 g, a top load minimum of 90 Lbf and a top load target of 115 Lbf. In some embodiments, finished container 210, as described herein, is manufactured to include a base having raised rings.

In some embodiments, finished container 210, as described herein, is manufactured to include a shoulder length L4, as shown in FIG. 11, of about 7 in and having a density average of 1.362, a density standard deviation of 0.0, an average crystallinity in a range of about 24.0% and a crystallinity standard deviation of 0.4%.

In some embodiments, finished container 210, as described herein, is manufactured to include a panel diameter D5, as shown in FIG. 11, of about 3.27 in, a density average of 1.362, a density standard deviation of 0.002, an average crystallinity in a range of about 23.3% and a crystallinity standard deviation of 1.4%.

In some embodiments, finished container 210, as described herein, is manufactured to include a base height H1, as shown in FIG. 11, of about 0.72 in, a density average of 1.358, a density standard deviation of 0.002, an average crystallinity in a range of about 20.8% and a crystallinity standard deviation of 1.3%.

Figure 13:
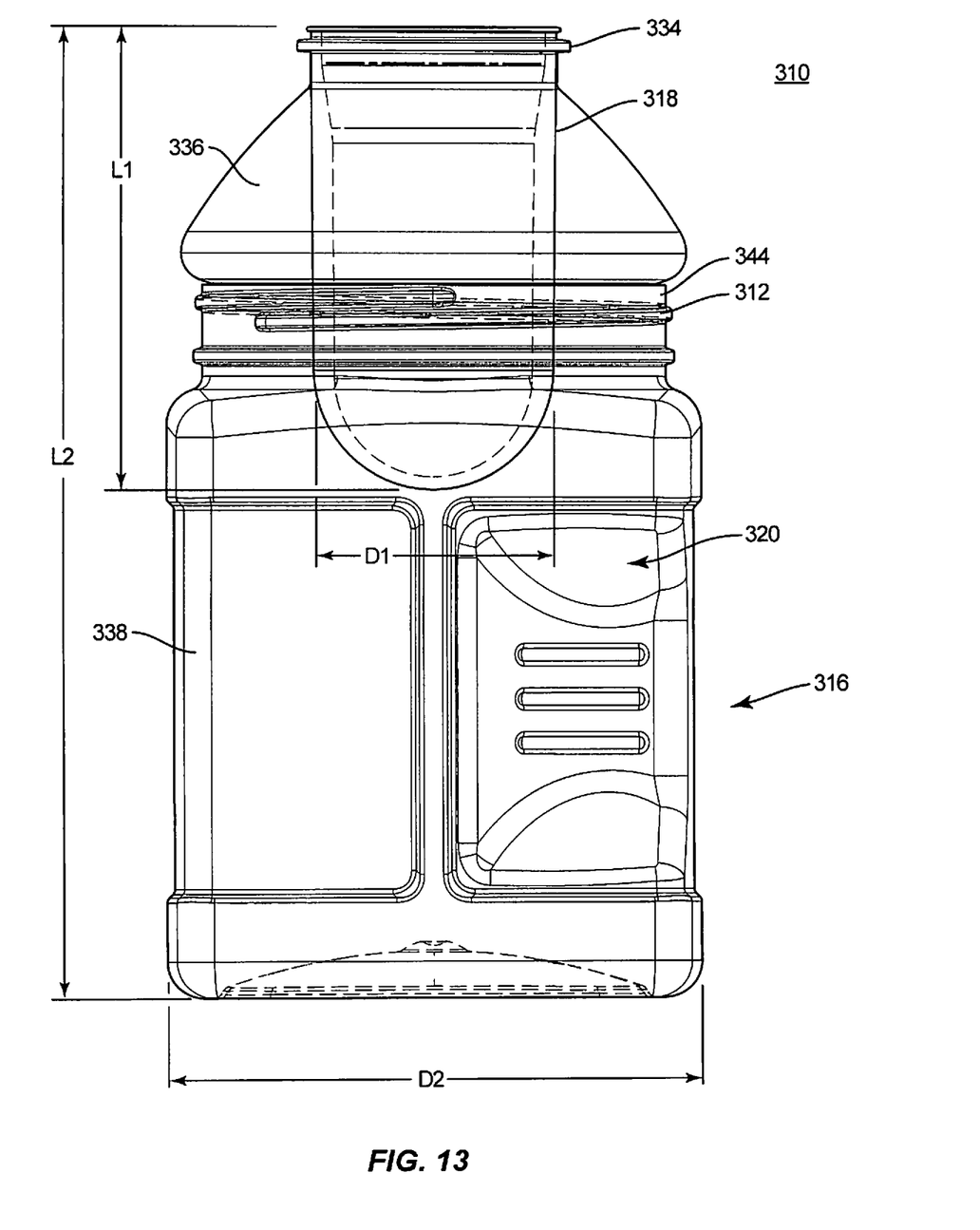
FIG. 13 is a side cross section view of components of one embodiment of a container system in accordance with the principles of the present disclosure.
Figure 14:
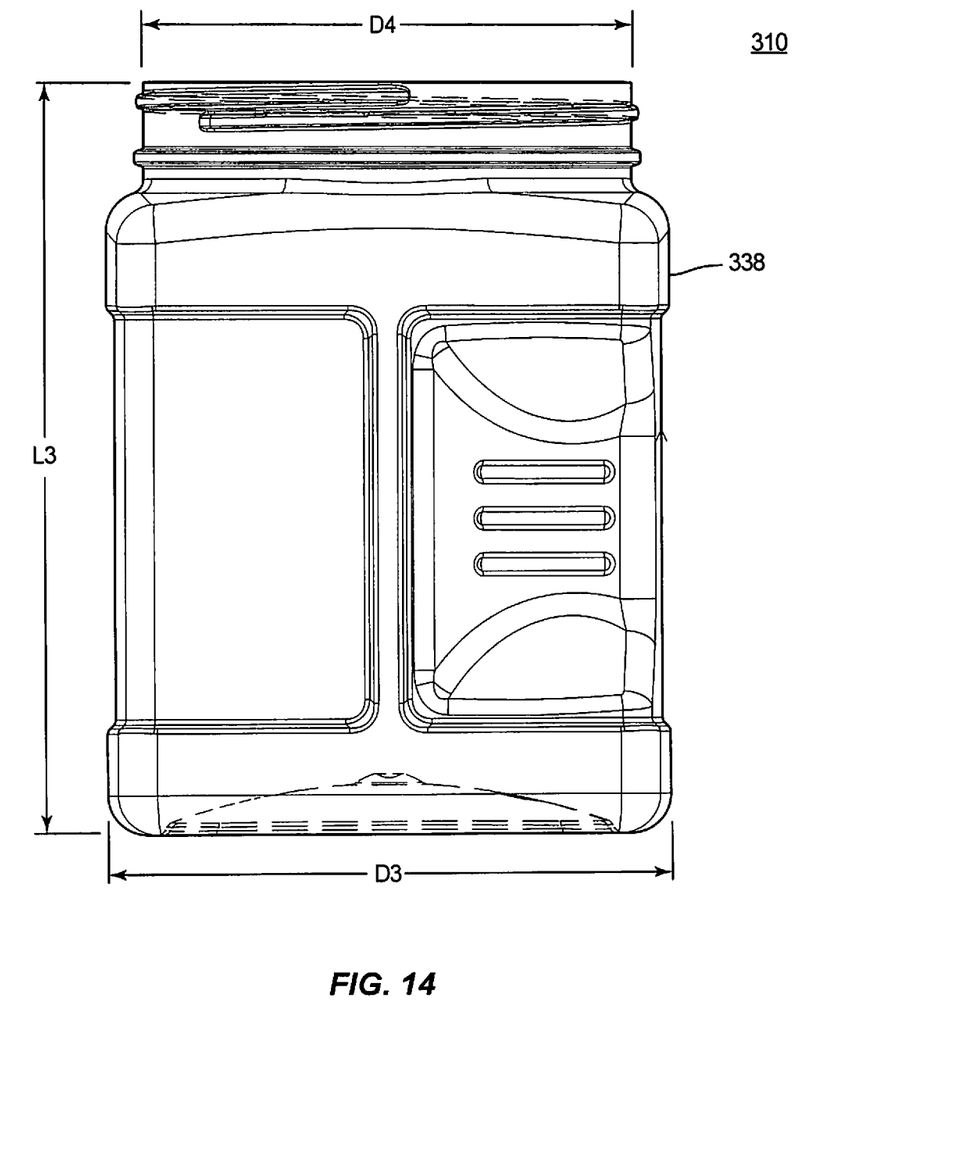
FIG. 14 is a side view of components of one embodiment of a container system in accordance with the principles of the present disclosure.

In one embodiment, as shown in FIGS. 13 and 14, a container 310, similar to the containers and methods described herein, is manufactured as a 60 ounce PET container. Container 310 includes an intermediate article 316. In some embodiments, a preform 318 is placed within cavity 320. Preform 318 has a flange 334. Preform 318 forms dome 336 of intermediate article 316 and forms body 338 of intermediate article 316.

In some embodiments, preform 318 has a diameter D1 and a length L1; and intermediate article 316 has a diameter D2 and a length L2. In some embodiments, diameter D2 is about 4.834 in and length L2 is about 9.442 in. In some embodiments, dome 336 is attached to an upper edge of neck 312 along an annular recess 344. In some embodiments, finished container 310, after trimming of intermediate article 316 as described herein, has a diameter D3 of approximately 4.834 in, a body length L3 of approximately 4.620 in, a neck diameter D4 of 110 mm, a weight of 96 g, a T/L weight of 90 g, a vacuum average actual of 2.107 inHg and a vacuum minimum actual of 1.100 inHg.

In some embodiments, the present manufacturing method provides PET enhancements via improved material orientation with selective physical performance features, such as, for example, improved top load performance, improved vacuum resistance performance and/or hoop strength, improved $O_2$ performance and improved MVTR performance. In some embodiments, finished containers 10, 110, 210 and/or 310, as described herein, are manufactured, as described herein, to include an average crystallinity in a range of about 20% to about 30%.

In some embodiments, finished containers 10, 110, 210 and/or 310, as described herein, are tested to determine one or more selective physical performance features, as described herein. In some embodiments, finished containers 10, 110, 210 and/or 310, as described herein, are tested to determine oxygen transmission rate, which comprises test conditions including a test gas concentration of 100% $O_2$, a test gas relative humidity of 50%, a test gas pressure of 760 mmHg, a test temperature of 23.0 degrees C./73.4 degrees F., a carrier gas of 98% nitrogen ($N_2$), 2% hydrogen ($H_2$) and a carrier gas humidity of 0% RH. In some embodiments, finished containers 10, 110, 210 and/or 310, as described herein, are tested yielding test results based on oxygen permeability utilizing a standard instrument, such as, for example, MOCON Oxtran 2/21 oxygen permeability instrument under an ASTM F1307 standard (provided by mocon, Minneapolis, Minn.).

In some embodiments, finished container 110, as described herein, includes an $O_2$ transmission rate of 4.98 cc/(package day). In some embodiments, finished container 110, as described herein, includes an $O_2$ transmission rate of 0.355 cc/(package day). In some embodiments, finished container 110, as described herein, includes an $O_2$ transmission rate of 0.668 cc/(package day). In some embodiments, finished container 110, as described herein, includes an $O_2$ transmission rate in a range of 0.25 through 5.00 cc/(package day).

In some embodiments, finished container 210, as described herein, includes an $O_2$ transmission rate of 0.334 cc/(package day). In some embodiments, finished container 210, as described herein, includes an $O_2$ transmission rate of 0.351 cc/(package day). In some embodiments, finished container 210, as described herein, includes an $O_2$ transmission rate of 0.364 cc/(package day). In some embodiments, finished container 210, as described herein, includes an $O_2$ transmission rate in a range of 0.25 through 0.50 cc/(package day). In some embodiments, finished containers 10, 110, 210 and/or 310, as described herein, includes an $O_2$ transmission rate in a range of 0.125 through 0.50 cc/(package day).

In some embodiments, finished containers 10, 110, 210 and/or 310, as described herein, can be fabricated from materials suitable for food packaging products. In some embodiments, such materials include synthetic polymers such as thermoplastics, semi-rigid and rigid materials, elastomers, fabric and/or their composites.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method for manufacturing a food and/or beverage packaging container, the method comprising:
   molding a preform having a threaded neck;
   disposing the preform in a mold having a temperature between about 40° F. and about 110° F. and forming the preform into an intermediate article having a length, a diameter and side walls having a wall thickness; and
   altering the intermediate article to form a finished container having a threaded wide mouth neck with a diameter greater than the neck of the preform,
   wherein the length, the diameter and the wall thickness are pre-selected such that the container comprises one or more selected physical performance features,
   wherein the one or more selected physical performance features include a density average in a range of 1.358 and 1.364,
   wherein the one or more selected physical performance features include crystallinity in a range of about 20% to about 30%, wherein the one or more selected physical performance features include a hoop stretch ratio in a range of about 1.6 to 1 to about 2.0 to 1, and wherein the one or more selected physical performance features include oxygen permeability having an $O_2$ transmission rate in a range of 0.125 through 0.50 cc/(package day).

2. A method for manufacturing a food and/or beverage packaging container as recited in claim 1, wherein the one or more selected physical performance features include top load features in a range of about 80 Lbf to about 130 Lbf.

3. A method for manufacturing a food and/or beverage packaging container as recited in claim 1, wherein the one or more selected physical performance features include vacuum resistance in a range of about 4 in Hg to about 8 in Hg.

4. A method for manufacturing a food and/or beverage packaging container as recited in claim 1, wherein the density average is 1.358.

5. A method for manufacturing a food and/or beverage packaging container as recited in claim 1, wherein the length is in a range of 6.41 in. to about 9.11 in., the diameter is in a range of 3.80 in. to about 4.83 in. and the wall thickness is in a range of 0.100 in to about 0.200 in.

6. A method for manufacturing a food and/or beverage packaging container as recited in claim 1, wherein the diameter is in a range of about 53 mm to about 120 mm and the wall thickness is in a range of about 0.045 in to about 0.060 in.

7. A method for manufacturing a finished container, the method comprising:

injection molding a preform having a threaded neck;

disposing the preform in a mold having a temperature between about 40° F. and about 110° F. and blow molding the preform into an intermediate article having a length, a diameter and side walls having a wall thickness based on a selected configuration of the preform; and trimming the intermediate article to form the finished container, the finished container including a body having a length, a diameter and side walls having a wall thickness based on a selected configuration of the preform, a threaded neck of the container having a diameter and a wall thickness, the diameter of the neck of the container being greater than a diameter of the neck of the preform, wherein the length, the diameters of the side walls and the neck of the container and wall thicknesses are selected such that the container comprises one or more selected physical performance features, wherein the one or more selected physical performance features include a density average in a range of 1.358 and 1.364, wherein the one or more selected physical performance features include crystallinity in a range of about 20% to about 30%, wherein the one or more selected physical performance features include a hoop stretch ratio in a range of about 1.6 to 1 to about 2.0 to 1, and wherein the one or more selected physical performance features include oxygen permeability having an $O_2$ transmission rate in a range of 0.125 through 0.50 cc/(package day).

8. A method for manufacturing a food and/or beverage packaging container as recited in claim 7, wherein the one or more selected physical performance features include top load features in a range of about 80 Lbf to about 130 Lbf.

9. A method for manufacturing a food and/or beverage packaging container as recited in claim 7, wherein the one or more selected physical performance features include vacuum resistance in a range of about 4 in Hg to about 8 in Hg.

10. A method for manufacturing a food and/or beverage packaging container as recited in claim 7, wherein the density average is 1.358.

11. A method for manufacturing a food and/or beverage packaging container, the method comprising the steps of:

providing a preform having a selected configuration, the selected configuration including a threaded neck;

disposing the preform in a mold having a temperature between about 40° F. and about 110° F.;

blow molding the preform into an intermediate article having a length, a diameter and side walls having a wall thickness; and trimming the intermediate article to form a finished container having a threaded wide mouth neck with a diameter greater than a diameter of the neck of the preform, the container comprising one or more selected physical performance features, wherein the one or more selected physical performance features include a density average in a range of 1.358 and 1.364, wherein the one or more selected physical performance features include crystallinity in a range of about 20% to about 30%, wherein the one or more selected physical performance features include a hoop stretch ratio in a range of about 1.6 to 1 to about 2.0 to 1, and wherein the one or more selected physical performance features include oxygen permeability having an $O_2$ transmission rate in a range of 0.125 through 0.50 cc/(package day).

12. A method as recited in claim 11, wherein the one or more selected physical performance features include top load features in a range of about 80 Lbf to about 130 Lbf.

13. A method as recited in claim 11, wherein the one or more selected physical performance features include vacuum resistance in a range of about 4 in Hg to about 8 in Hg.

14. A method for manufacturing a food and/or beverage packaging container as recited in claim 1, wherein the wide mouth neck includes a continuous thread having an outer diameter in a range of about 53 mm to about 162 mm.

15. A method as recited in claim 11, wherein the intermediate article includes a neck and a dome, the step of trimming the intermediate article comprising severing the dome of the intermediate article from the neck of the intermediate article.

16. A method as recited in claim 15, wherein the dome of the intermediate article is attached an upper edge of the neck of the intermediate article along an annular recess before the dome of the intermediate article is severed from the neck of the intermediate article.

17. A method as recited in claim 11, further comprising pre-heating the preform before disposing the preform in the mold.

18. A method as recited in claim 17, wherein the preform is pre-heated to a temperature in a range of about 95 degrees Celsius (C) to about 110 degrees C.

19. A method for manufacturing a food and/or beverage packaging container as recited in claim 1, wherein the density average is 1.365.

20. A method for manufacturing a food and/or beverage packaging container as recited in claim 7, wherein the density average is 1.365.

\* \* \* \* \*